(12) United States Patent
Gärtner

(10) Patent No.: US 8,170,746 B2
(45) Date of Patent: May 1, 2012

(54) METHOD FOR DETERMINING UNSTABLE DRIVING STATES

(75) Inventor: Michael Gärtner, Frankfurt am Main (DE)

(73) Assignee: Continetal Teves AG & Co. oHG (DE)

( * ) Notice: Subject to any disclaimer, the term of this patent is extended or adjusted under 35 U.S.C. 154(b) by 634 days.

(21) Appl. No.: 12/295,953

(22) PCT Filed: Apr. 5, 2007

(86) PCT No.: PCT/EP2007/053395
§ 371 (c)(1),
(2), (4) Date: Mar. 19, 2009

(87) PCT Pub. No.: WO2007/113329
PCT Pub. Date: Oct. 11, 2007

(65) Prior Publication Data
US 2010/0010701 A1 Jan. 14, 2010

(30) Foreign Application Priority Data

Apr. 6, 2006 (DE) .......................... 10 2006 016 223
Apr. 5, 2007 (DE) .......................... 10 2007 016 951

(51) Int. Cl.
*B60W 30/02* (2006.01)
(52) U.S. Cl. ........................................... 701/36; 701/38
(58) Field of Classification Search ................... 701/29, 701/31, 34, 36, 37, 39, 40, 41, 43, 44, 70, 701/45; 180/197, 281, 282; 280/735; 340/440, 340/438
See application file for complete search history.

(56) References Cited

U.S. PATENT DOCUMENTS

| | | | |
|---|---|---|---|
| 5,691,900 A * | 11/1997 | Luckevich | 701/41 |
| 5,729,476 A | 3/1998 | Pfau | |
| 5,734,570 A * | 3/1998 | Arlandis | 701/42 |
| 6,122,577 A | 9/2000 | Mergenthaler et al. | |
| 6,122,584 A * | 9/2000 | Lin et al. | 701/70 |
| 6,205,391 B1 * | 3/2001 | Ghoneim et al. | 701/70 |
| 6,226,575 B1 * | 5/2001 | Lu et al. | 701/29 |
| 6,244,109 B1 | 6/2001 | Kohler et al. | |
| 6,295,486 B1 * | 9/2001 | Denz | 701/1 |
| 6,453,226 B1 * | 9/2002 | Hac et al. | 701/48 |
| 6,616,150 B2 * | 9/2003 | Reisinger et al. | 280/5.514 |

(Continued)

FOREIGN PATENT DOCUMENTS

DE 44 44 408 A1 6/1996

(Continued)

*Primary Examiner* — Paul N. Dickson
*Assistant Examiner* — George D. Spisich
(74) *Attorney, Agent, or Firm* — RatnerPrestia

(57) ABSTRACT

A method for identifying unstable driving states is disclosed. The method comprises the following steps: (a) detecting whether the magnitude of a difference between a first value of a driving state variable that is detected by means of a first sensor, and a second value of the driving states variable that is calculated from measured values of at least one further sensor, increases over time, (b) filtering the difference by means of a delay element after it has been established that the difference has increased, (c) comparing the filters difference and the unfiltered difference, and (d) establishing the presence of an unstable driving states when the comparison shows that a deviation between the filtered difference and the unfiltered difference exceeds a predefined threshold value. The method enables an unstable driving state to be identified even when a driving states variable has an offset error which is of the desired size.

10 Claims, 1 Drawing Sheet

U.S. PATENT DOCUMENTS

| | | |
|---|---|---|
| 6,625,527 B1 | 9/2003 | Ding et al. |
| 6,895,357 B2 * | 5/2005 | Lou et al. .................. 702/151 |
| 7,392,116 B2 * | 6/2008 | Kesselgruber .................. 701/1 |
| 2003/0144777 A1 * | 7/2003 | Schmitt .................. 701/29 |
| 2005/0273218 A1 * | 12/2005 | Breed et al. .................. 701/2 |
| 2006/0020378 A1 | 1/2006 | Salman et al. |

FOREIGN PATENT DOCUMENTS

| | | |
|---|---|---|
| DE | 198 19 780 A1 | 11/1998 |
| DE | 198 44 880 A1 | 4/2000 |
| EP | 1 013 526 A2 | 12/1999 |
| EP | 1 388 483 A2 | 7/2003 |
| GB | 2 327 995 A | 2/1999 |

\* cited by examiner

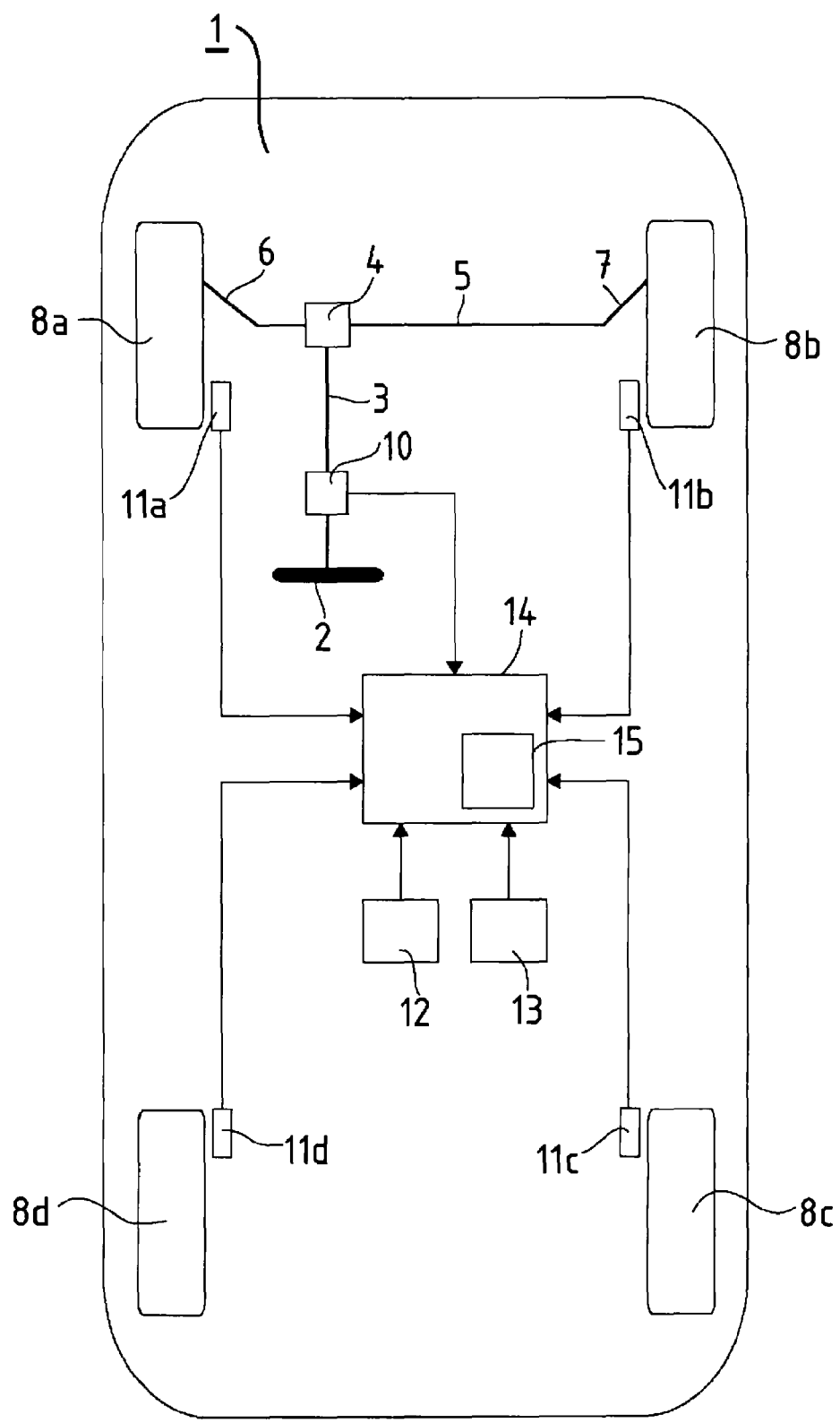

METHOD FOR DETERMINING UNSTABLE DRIVING STATES

CROSS REFERENCE TO RELATED APPLICATIONS

This application is the U.S. national phase application of PCT International Application No. PCT/EP2007/053395, filed Apr. 5, 2007, which claims priority to German Patent Application No. DE 10 2006 016 223.4, filed Apr. 6, 2006 and German Patent Application No. DE 10 2007 016 951.7, filed Apr. 5, 2007, the contents of such applications being incorporated herein by reference in their entirety.

TECHNICAL FIELD

The present invention relates to a method for determining unstable driving states.

BACKGROUND OF THE INVENTION

In motor vehicles, incremental sensors are frequently used to acquire driving state variables. Such sensors only permit changes in the driving state variable to be detected. On the basis of a detected starting value it is possible to acquire the absolute value of the driving state variable by reference to the changes which are acquired. In order to determine the absolute value of the driving state variable, it is therefore necessary firstly to acquire at least one absolute value which is used to acquire the starting value. This absolute value can be calculated in a model-based fashion with reference, for example, to measured values of further driving state variables.

Incrementally measuring steering angle sensors are used particularly frequently in motor vehicles. In order to acquire an absolute value of the steering angle which is used to determine the starting value for the measurement of the steering angle, it is possible to acquire, for example by means of further sensor signals, whether the vehicle is traveling straight ahead, since in this situation it is possible to assume an absolute steering angle of zero. In addition, it is possible, for example, to calculate an absolute value of the steering angle, as explained further below, in a vehicle model and to use it to determine a starting value. In known applications, this starting value has to be newly acquired after each restart of the ignition. In order to be able to determine the absolute value with sufficient precision, said absolute value has to be evaluated over a relatively long period of time after the restart of the ignition. During this time period, an absolute value of the steering angle is not available. The steering angle can only be determined with respect to a starting value which is selected as desired and which corresponds, for example, to a value which was present when the preceding ignition sequence ended. However, this does not generally correspond to the absolute value of the steering angle which is present at a restart of the ignition since the steering angle can be changed while the ignition is switched off. The steering angle which is determined by means of such a starting value therefore generally has an offset error whose magnitude is not known.

Reliable model-based evaluation of the driving situation in order to determine the absolute value of the steering angle can only be performed when the driving state of the vehicle is stable, i.e. when the vehicle follows the steering specifications of the driver in a defined way. In the unstable driving situations, i.e. driving situations in which the vehicle does not follow the driving specifications in a "normal" way, there is no defined relationship between the measured driving state variables and the driver's steering specifications. For this reason, such an evaluation of the driving situation for determining an absolute value of the steering angle can be performed only when there is a stable driving state. As a result, it is necessary to detect unstable driving states.

Known methods for reliably detecting unstable driving situations are based on comparing measured values of a driving state variable with values which are calculated by means of driver specifications in vehicle models. However, such a comparison generally requires knowledge of the absolute values of all the driving state variables. For this reason, these methods cannot be applied unless an absolute value has been determined for the steering angle.

These and other aspects of the invention are illustrated in detail by way of the embodiments and are described with respect to the embodiments in the following, making reference to the Figures.

SUMMARY OF THE INVENTION

An object of the present invention is to propose a method which also permits for any magnitude of offset errors of the value of a driving state variable when reliably detecting unstable driving states.

This object is achieved by a method for determining unstable driving states, as described hereinafter.

There is provision to carry out a method of the type mentioned above having the following steps:
  a) determining whether the difference between a first value of a driving state variable, which difference is acquired by means of a first sensor, and a second value of the driving state variable, which is calculated from measured values of at least one further sensor, increases in size over time,
  b) filtering the difference by means of a delay element after it has been detected that the difference has increased,
  c) comparison of the filtered difference and the unfiltered difference,
  d) detection of the presence of an unstable driving state if the comparison reveals that a deviation between the filtered difference and the unfiltered difference exceeds a predefined threshold value.

A high value of the previously mentioned difference would already indicate the presence of an unstable driving state if the value of the driving state variable were an absolute value which did not have an offset error. However, in contrast, the invention is based on the idea of evaluating the change in the difference in order to detect the presence of an unstable driving state. In this way the presence of an unstable driving state can be determined independently of knowledge of the absolute values for any magnitude of error of the first value of the driving state variable. The only precondition is that the error only changes slowly compared to the measured values, as is the case, in particular, with constant offset errors.

In order to evaluate the change in the difference, the difference is advantageously filtered by means of a delay element, and a comparison between the filtered and the unfiltered difference is carried out. Such filtering permits the behavior of the motor vehicle which reacts to driver specifications with a certain delay to be taken into account. The filtering advantageously begins when it has been detected that the difference has increased since an increase in the difference indicates a possible instability.

One embodiment of the invention is characterized in that the steps b), c) and d) are repeated if the deviation between the unfiltered difference and the filtered difference increases, and in that step a) is carried out after it has been detected that the deviation between the unfiltered difference and the filtered difference has not increased.

The method with step a) is therefore advantageously started anew if the deviation between the unfiltered difference and the filtered difference no longer increases. If no increase in the difference is observed for a defined time period after a previously detected instability, it can no longer be assumed that an unstable driving state is present. This time period is therefore to be dimensioned in such a way that the vehicle firstly can recover completely to a stable driving state.

One embodiment of the invention provides that the delay element is a $PT_n$ element, in particular a $PT_1$ element or a $PT_2$ element.

The transmission behavior of the motor vehicle can be modeled in a particularly realistic way by means of a $PT_2$ element. However, it has been found that unstable driving situations can be determined equally reliably using a $PT_1$ element. Compared to a $PT_2$ element, a $PT_1$ element has the advantage in this context that it requires less computational work so that computing resources can be saved.

In addition, in one refinement of the invention there is provision that the variable is a lock angle of steerable wheels of the motor vehicle or a rotational angle of a steering wheel of the motor vehicle.

One development of the invention is characterized in that the second value of the variable is acquired from a measured yaw rate of the motor vehicle and a measured lateral acceleration of the motor vehicle in a vehicle model.

An associated embodiment of the invention includes the fact that the vehicle model is a steady-state single-track model of the motor vehicle.

In one refinement of the invention there is provision that the first value of the driving state variable is acquired on the basis of a starting value by means of an incremental sensor.

The starting value can basically be selected as desired since a faulty starting value only leads to an offset error of the first value of the driving state variable, and the invention permits unstable driving states to be detected independently of such offset errors. An expedient selection of the starting value when the ignition is restarted is, for example, the last value of the driving state variable which was acquired in a preceding ignition sequence.

Furthermore, a computer program product is made available which has a computer program which comprises instructions for carrying out a method of the type mentioned at the beginning.

The method according to aspects of the invention makes it possible to reliably detect the presence of an unstable driving situation in the case of an input signal with an offset error. Although other systems can also profit from the method according to aspects of the invention, vehicles with an incrementally measuring steering angle sensor constitute a preferred application of the invention. In such vehicles, the invention permits the presence of unstable driving states to be detected before an absolute value of the steering angle is present.

BRIEF DESCRIPTION OF THE FIGURE

FIG. 1 illustrates in schematic form a motor vehicle with a control unit for carrying out a method according to aspects of the invention.

DETAILED DESCRIPTION OF AN EXEMPLARY EMBODIMENT

FIG. 1 is a schematic illustration of a motor vehicle 1 with four wheels 8a, 8b, 8c, 8d. The motor vehicle has a steering system in which a steering wheel 2 engages via the steering shaft 3 and a steering gear 4 into a track rod 5 to which further track rods 6, 7 are attached laterally, which further track rods 6, 7 are each connected to a steerable wheel 8a, 8b of the vehicle. By rotating the steering wheel 2, it is possible to change the steering angle at the steerable wheels 8a, 8b. The rotational angle of the steering wheel 2 and/or of the steering shaft 3 is sensed by means of a steering angle sensor 10.

It is assumed that the steering angle sensor 10 is an incremental sensor. Such a sensor only permits changes in the steering angle to be detected. On the basis of a known starting value it is possible to determine the absolute value of the steering angle by means of the determined changes in the steering angle. However, since the absolute value of the steering angle which is present when the ignition is switched on is generally not known, the absolute steering angle cannot generally be acquired immediately after a restart of the ignition. In order to determine the absolute steering angle, at least one absolute steering angle must firstly be determined, and said steering angle is used to acquire the starting value for measuring the steering angle. For this purpose, it is possible, for example by means of further sensor signals, to detect whether the vehicle is traveling straight ahead, since in this situation an absolute steering angle of zero can be assumed. In addition, it is possible, for example, to calculate an absolute value of the steering angle, as explained further below, in a vehicle model and to use it to determine the offset error. Such methods for determining the absolute steering angle by means of a steering angle sensor which measures in a relative fashion are known per se to a person skilled in the art and are therefore not explained here in particular.

The motor vehicle 1 also has in each case a wheel speed sensor 11a, 11b, 11c, 11d on each wheel 8a, 8b, 8c, 8d and a yaw rate sensor 12 and a lateral acceleration sensor 13.

The signals of the previously mentioned sensors are fed to a control unit 14 which has a module 15 in which an unstable driving state is detected, in particular without knowledge of the absolute value of the steering angle. This detection is carried out as long as the methods for determining the absolute value of the steering angle have not yet ended, i.e. an absolute value of the steering angle cannot be acquired. Such detection is important because models for modeling the vehicle behavior, which are only valid when the driving behavior is stable, are used in the previously outlined methods for determining an absolute value of the steering angle. If the presence of an unstable driving state is detected in the module 15, these methods therefore have to be adapted or interrupted.

The control unit 14 and the module 15 operate in a clocked fashion with a predefined clock period. One clock cycle is also referred to as a loop in the text which follows.

In one embodiment of the invention, the steering angle in the module 15 is determined after a restart of the ignition on the basis of the last absolute value of the steering angle in the preceding ignition cycle by means of the signals of the steering angle sensor 10. For this purpose, the absolute value of the steering angle is stored continuously in a nonvolatile memory, and when a restart of the ignition occurs the value present in the memory is read out. The steering angle which is determined on the basis of this starting value is referred to in the text which follows as steering angle SWA. Since the steering wheel 2 may have been rotated while the ignition was switched off, the steering angle SWA generally does not correspond to the absolute value of the steering angle. If the steering wheel 2 has been rotated when the ignition was switched off, the steering angle SWA has instead an offset error whose value corresponds to the rotational angle by which the steering angle 2 has been rotated.

In addition, a steering angle STATIONARY_SWA is calculated in a vehicle model in the module 15 or in the control unit 14 assuming steady-state conditions. In one embodiment, the linear single-track model is used here and the steering angle STATIONARY_SWA is calculated by means of $$\text{STATIONARY\_SWA} = \left(\frac{l \cdot \dot{\psi}}{v} + a_y \cdot EG\right) \cdot i_L \quad (1)$$

In this context, l is the wheel base of the vehicle, $\dot{\psi}$ is the yaw rate measured by means of the yaw rate sensor 12, v is the vehicle velocity acquired from the signals of the wheel speed sensors 11a, 11b, 11c, 11d, $a_y$ is the lateral acceleration (in the center of gravity system of the vehicle) measured by means of the lateral acceleration sensor 13 and EG is the intrinsic steering gradient of the vehicle. The wheel base l is a constant parameter. The intrinsic steering gradient EG can likewise be predefined as a constant parameter. The values of these parameters can be stored in a memory of the control unit 14 and do not have to be determined dynamically. $i_L$ denotes the steering transmission ratio between the wheel lock angle and the steering angle at the steering wheel 2. In one embodiment of the invention, this value is fixed and can also be stored in a memory of the control unit 14. The steering angle STATIONARY_SWA is calculated once in each loop and supplies a first estimate of the absolute value of the steering angle.

When the steering wheel 2 is rotated, the behavior of the vehicle follows the steering angle specification but only with a certain delay, with the result that a phase difference arises between the steering angle on the one hand and the yaw rate and lateral acceleration on the other. Therefore, in one embodiment of the invention, the steering angle STATIONARY_SWA is corrected by means of a correction term STAT_SWA_CORR, which is produced essentially from the change in the steering angle determined by means of the steering angle sensor 10. The correction term STAT_SWA_CORR is given in the n-th loop by $$\text{STAT\_SWA\_CORR}(n) = (\text{SWA}(n) - \text{SWA}(n-1)) + \text{corr\_factor} \cdot \text{STAT\_SWA\_CORR}(n-1) \quad (2)$$

where SWA(n) denotes the value of the steering angle SWA in the n-th loop, and the variable STAT_SWA_CORR is initialized in the first loop with the value 0 (STAT_SWA_CORR(1)=0). The factor corr_factor is a correction factor which assumes, for example, the value 15/16.

A steering angle CALCULATED_SWA is calculated from the steering angle STATIONARY_SWA and the variable STAT_SWA_CORR, said steering angle CALCULATED_SWA being given by $$\text{CALCULATED\_SWA} = \text{STATIONARY\_SWA} + \text{STAT\_SWA\_CORR} \quad (3)$$

The algorithm for determining unstable driving states which is executed in the module 15 is configured to detect driving situations in which the motor vehicle 1 does not follow, or does not completely follow, the steering specifications of the driver. Basically, such a situation can be detected from the fact that the difference between the absolute value of the steering angle and the calculated steering angle CALCULATED_SWA is large. However, this requires knowledge of the absolute steering angle. In order to detect such a situation even when the absolute value of the steering angle is not yet known, the method illustrated below is applied.

In each loop, in the module 15, the difference $$\text{swa\_dev} = |\text{SWA} - \text{CALCULATED\_SWA}| \quad (4)$$

is determined.

Basically, the previously described unstable driving state is present if the difference swa_dev becomes larger. However, in this context it is to be noted that the vehicle reacts only with a certain delay to steering movements, as already mentioned. In the case of a change in steering angle, the difference swa_dev becomes larger even when a stable driving state is present. For this reason, the algorithm described below is based on the comparison between the unfiltered difference swa_dev and a filtered difference SWA_DEV_FILTERED which is acquired from the unfiltered difference and which is acquired by means of a delay element. In this context, the delay in the vehicle reaction is taken into account by means of the filtering.

In one embodiment, the actual detection of unstable driving states is not performed until the velocity of the vehicle is higher than a predefined threshold value which is, for example, 10.8 km/h. As long as the velocity of the vehicle is below the threshold value, the filtered difference SWA_DEV_FILTERED is set to be equal to the unfiltered difference swa_dev.

If the velocity of the vehicle is above the threshold value, in each loop n the unfiltered difference swa_dev(n) which is acquired in this loop is compared with the filtered difference SWA_DEV_FILTERED(n−1) which is acquired in the preceding loop. If it is detected in this context that swa_dev(n) is not greater than SWA_DEV_FILTERED(n−1), in the loop n the filtered difference SWA_DEV_FILTERED is set to be equal to the unfiltered difference swa_dev. However, if it is detected that swa_dev(n) is greater than SWA_DEV_FILTERED(n−1), the signal swa_dev is filtered. The filtering of the difference swa_dev therefore takes place only if this difference has become larger.

In one embodiment of the invention, the filtered difference SWA_DEV_FILTERED is given in the n-th loop by $$\text{SWA\_DEV\_FILTERED}(n) = \text{const1} \cdot \text{SWA\_DEV\_FILTERED}(n-1) + \text{const2} \cdot \text{swa\_dev} \quad (5)$$

where const1=(filt_const−1)/filt_const and const2=1/filt_const. Where filt_const denotes a filter constant which has, for example, the value 256. The filter rule in the equation (5) corresponds to a $PT_1$ transmission behavior of the filter, i.e. a delay element of the first order. In further embodiments of the invention it is likewise also possible to use a different filter, for example a filter with $PT_2$ transmission behavior, i.e. a delay element of the second order. However, a $PT_1$ element loads the processor of the control unit 14 to a small degree and also produces satisfactory results.

If filtering is performed for the first time in one loop, a comparison is in turn performed between swa_dev(n) SWA_DEV_FILTERED(n−1) and the value of the filtered difference SWA_DEV_FILTERED(n) in the following loops in the way described above. That is to say if swa_dev(n) is not greater than SWA_DEV_FILTERED(n−1), the filtered difference SWA_DEV_FILTERED(n) is set to be equal to the unfiltered difference swa_dev(n), and otherwise SWA_DEV_FILTERED(n) is calculated according to equation (5).

An unstable driving state is detected if, in a loop n, the difference between the unfiltered difference swa_dev(n) and the filtered difference SWA_DEV_FILTERED(n−1) exceeds a predefined threshold value which is, for example, 30°.

A detected unstable driving state is reset, i.e. a stable driving state is assumed again if the previously mentioned difference drops below the predefined threshold value. In addition to the previously described detection, a high correction term STAT_SWA_CORR additionally also indicates an unstable driving state. For this reason, in one embodiment, an unstable driving state is reset only if, in addition, the correction term STAT_SWA_CORR is smaller than a predefined threshold value which is, for example, 20°.

Of course, the previous description of exemplary embodiments is to be understood as purely exemplary. Basically, the invention can also be embodied in a different way. In particular, it is not restricted to determining an unstable driving situation in the case of a faulty steering angle signal. Instead, in a similar way it is also possible to determine unstable driving states if a measurement signal of another driving state variable is faulty. The invention likewise also permits a reliable detection of unstable driving states if correct absolute values of the driving state variables are used.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A method for detecting an unstable driving state of a motor vehicle, comprising the following steps:
    a) determining whether a difference between a first value of a driving state variable that is acquired by a first sensor and a second value of the driving state variable that is calculated from measured values of at least one further sensor increases in size over time,
    b) filtering the difference by a delay element,
    c) comparing an unfiltered difference with the filtered difference,
    d) detecting a presence of an unstable driving situation if the comparing step reveals that a deviation between the unfiltered difference and the filtered difference exceeds a predefined threshold value.

2. The method as claimed in claim 1, wherein the steps b), c) and d) are repeated if the deviation between the unfiltered difference and the filtered difference increases, and in that step a) is carried out after it has been detected that the deviation between the unfiltered difference and the filtered difference has not increased.

3. The method as claimed in claim 1, wherein the delay element is a $PT_n$ element.

4. The method as claimed in claim 3, wherein the delay element is a $PT_1$ element or a $PT_2$ element.

5. The method as claimed in claim 1, wherein the driving state variable is a lock angle of steerable wheels of the motor vehicle or a rotational angle of a steering wheel of the motor vehicle.

6. The method as claimed in claim 5, wherein the second value of the driving state variable is calculated from a measured yaw rate of the motor vehicle and a measured lateral acceleration of the motor vehicle in a vehicle model.

7. The method as claimed in claim 6, wherein the vehicle model is a steady-state single-track model of the motor vehicle.

8. The method as claimed in claim 1, further comprising the step of acquiring the first value of the driving state variable by an incremental sensor on the basis of a starting value.

9. The method as claimed in claim 8, wherein when the ignition is restarted a last value of the driving state variable which was acquired in a preceding ignition sequence is used as the starting value.

10. A computer program product which has a computer program which comprises instructions for carrying out a method as claimed in claim 1 in a processor.

* * * * *